(12) United States Patent
Rogers et al.

(10) Patent No.: US 11,982,406 B1
(45) Date of Patent: May 14, 2024

(54) METHOD AND APPARATUS FOR CONTROLLING TEMPERATURE AND PRESSURE INSIDE A PROPELLANT TANK

(71) Applicant: United Launch Alliance, L.L.C., Centennial, CO (US)

(72) Inventors: Jeffrey J. Rogers, Littleton, CO (US); Joel Cy Scott, Lone Tree, CO (US)

(73) Assignee: United Launch Alliance, L.L.C., Centennial, CO (US)

(*) Notice: Subject to any disclaimer, the term of this patent is extended or adjusted under 35 U.S.C. 154(b) by 113 days.

(21) Appl. No.: 17/584,738

(22) Filed: Jan. 26, 2022

Related U.S. Application Data

(60) Provisional application No. 63/147,097, filed on Feb. 8, 2021, provisional application No. 63/147,092, filed on Feb. 8, 2021.

(51) Int. Cl.
*F17C 13/00* (2006.01)
*B64G 1/40* (2006.01)

(52) U.S. Cl.
CPC .............. *F17C 13/00* (2013.01); *B64G 1/402* (2013.01)

(58) Field of Classification Search
CPC ....... B64G 1/402; B64G 1/4021; F17C 13/00; F17C 13/008; F02K 9/50
See application file for complete search history.

(56) References Cited

U.S. PATENT DOCUMENTS

| | | | |
|---|---|---|---|
| 1,159,957 A | 11/1915 | Kneass | |
| 1,988,635 A | 1/1935 | Sutton | |
| 2,399,670 A | 5/1946 | Freygang | |
| 5,624,239 A | 4/1997 | Osika | |
| 6,151,900 A * | 11/2000 | Lak | B64G 1/402 62/7 |
| 6,315,000 B1 * | 11/2001 | Goodyear | B01D 53/74 137/892 |
| 7,255,136 B2 * | 8/2007 | Templet | F04B 39/00 141/286 |
| 7,536,864 B2 | 5/2009 | Wolfe et al. | |
| 8,083,495 B2 | 12/2011 | Whaling et al. | |
| 8,142,169 B2 | 3/2012 | Whaling et al. | |
| 9,140,470 B2 | 9/2015 | Verma et al. | |

(Continued)

FOREIGN PATENT DOCUMENTS

| | | |
|---|---|---|
| GB | 2450565 | 12/2008 |

OTHER PUBLICATIONS

"Basic principles of vacuum technology, brief overview," Festo, Jul. 2013, 54 pages [retrieved online Feb. 18, 2022 from: www.festo.com/net/SupportPortal/Files/286804/Basic_Vacuum_Technology_Principles.pdf].

(Continued)

*Primary Examiner* — Richard G Davis
(74) *Attorney, Agent, or Firm* — Sheridan Ross P.C.

(57) ABSTRACT

A system and method for controlling the temperature and pressure within a propellant tank containing cryogenic liquid and gaseous phase propellants, the latter also referred to as ullage, by adding an atomized fluid or mixture of fluids having one or more constituent parts to the ullage, where the atomized fluid(s) has a temperature less than the temperature of the ullage. The motive fluid may include a condensable constituent which aids in reducing pressure in the tank or a incondensable constituent which aides in maintaining pressure in the tank.

20 Claims, 11 Drawing Sheets

(56) References Cited

U.S. PATENT DOCUMENTS

Figure 1:
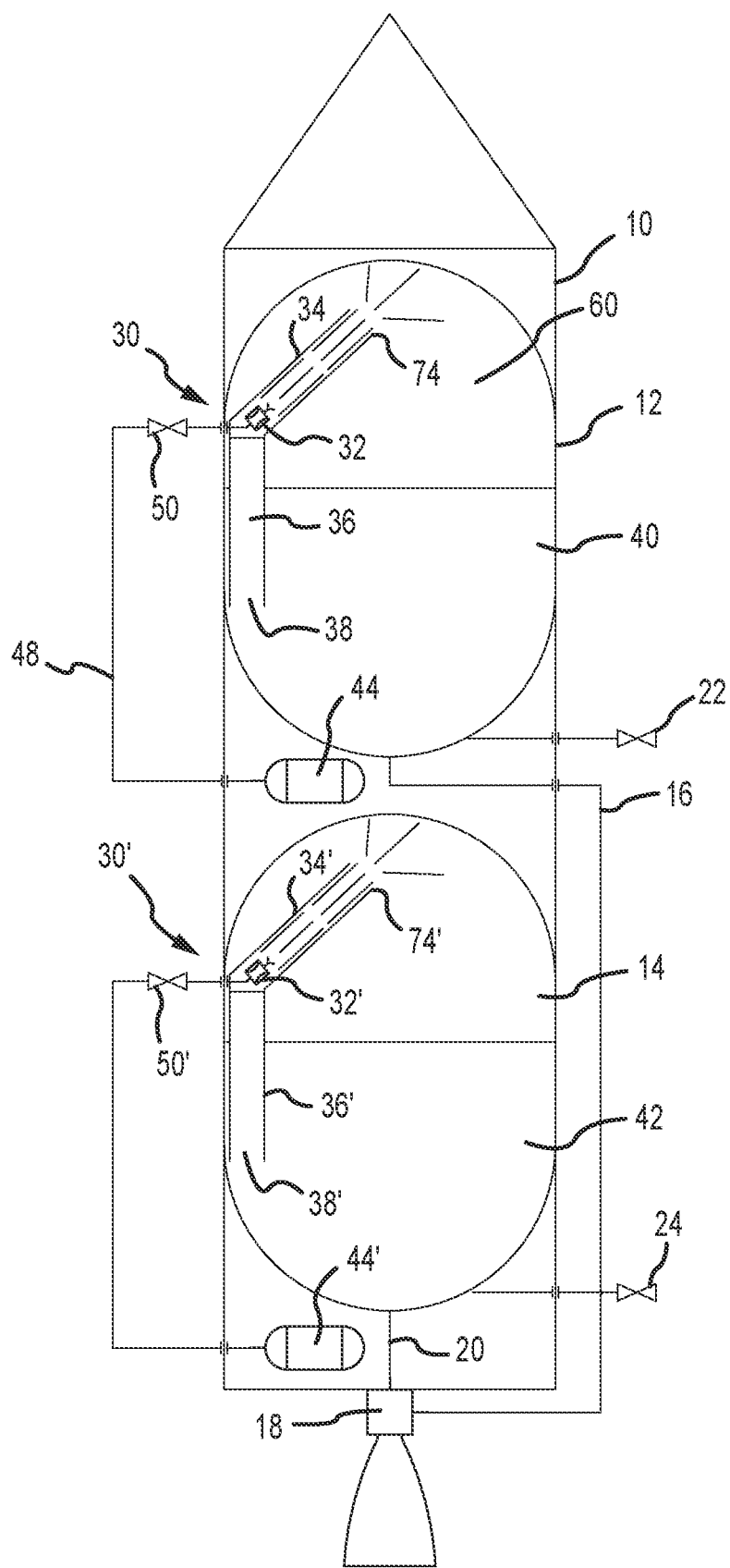

| | | | |
|---|---|---|---|
| 9,175,688 B2 | 11/2015 | Neel | |
| 2004/0144102 A1* | 7/2004 | Lozano | F17C 13/088 62/46.1 |
| 2015/0152885 A1 | 6/2015 | Dennis | |
| 2019/0309996 A1* | 10/2019 | Chancery | F25B 9/02 |

OTHER PUBLICATIONS

Official Action for U.S. Appl. No. 17/850,839, dated Aug. 3, 2023 8 pages Restriction Requirement.
Official Action for U.S. Appl. No. 17/850,839, dated Oct. 25, 2023 13 pages.

* cited by examiner

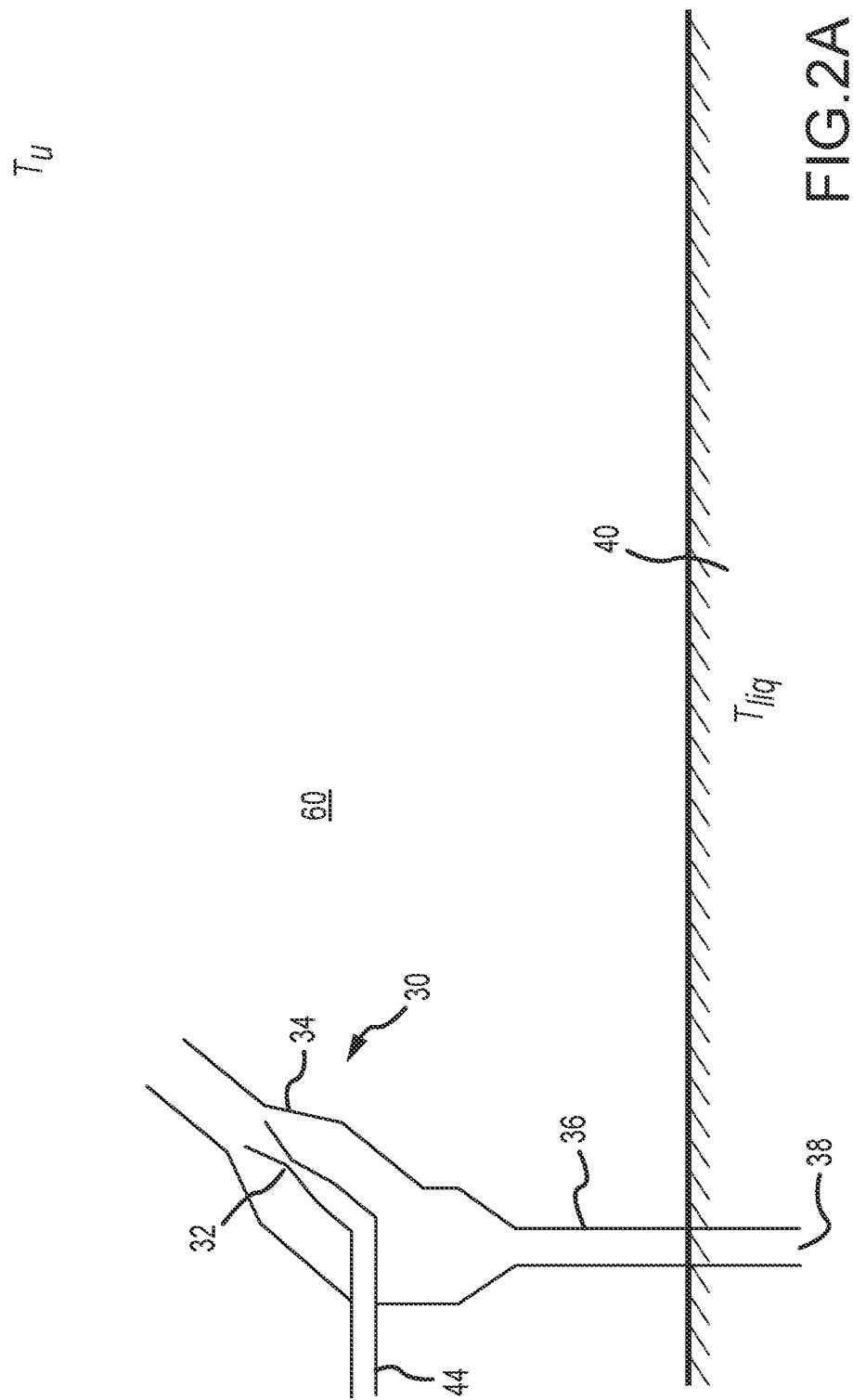

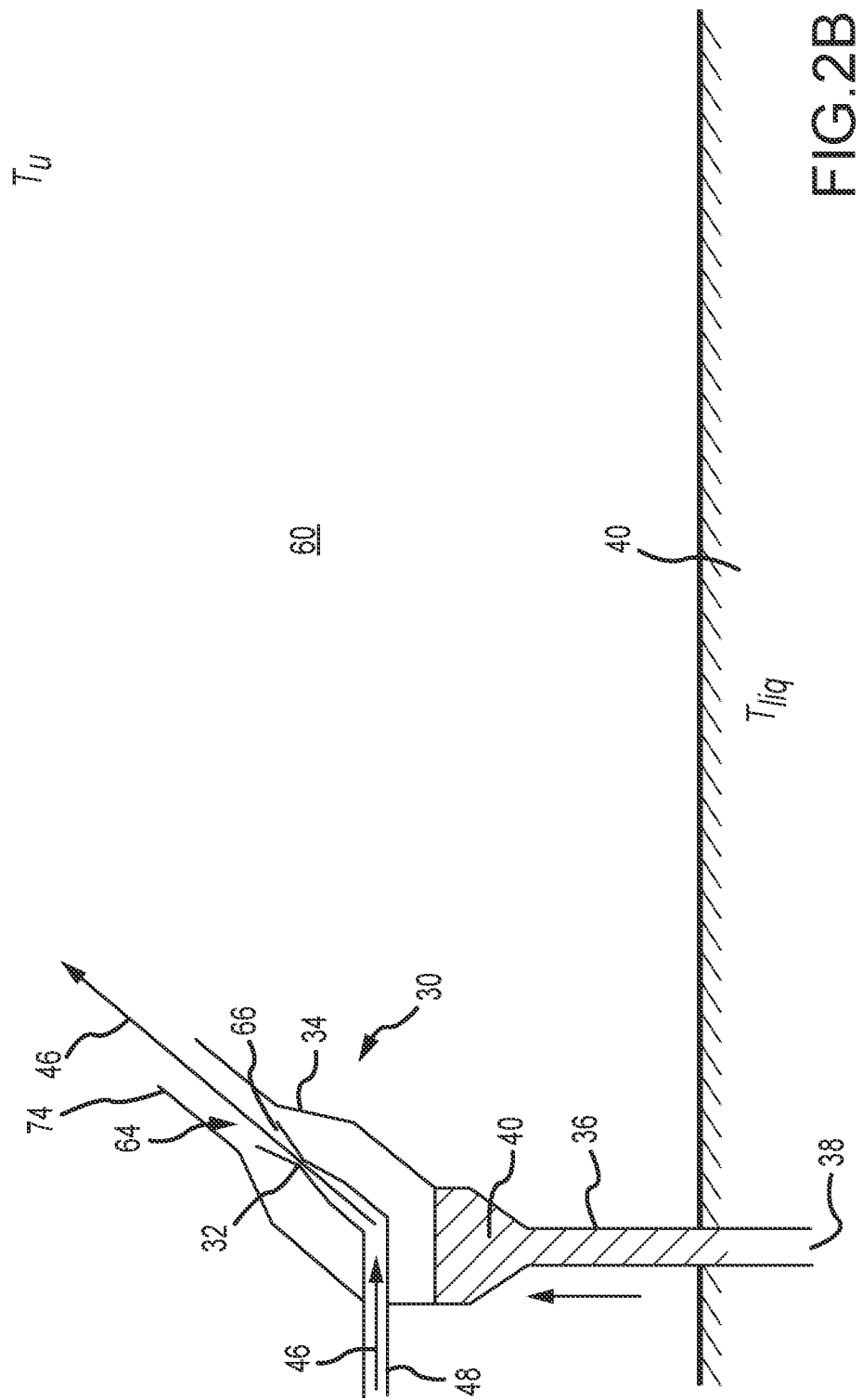

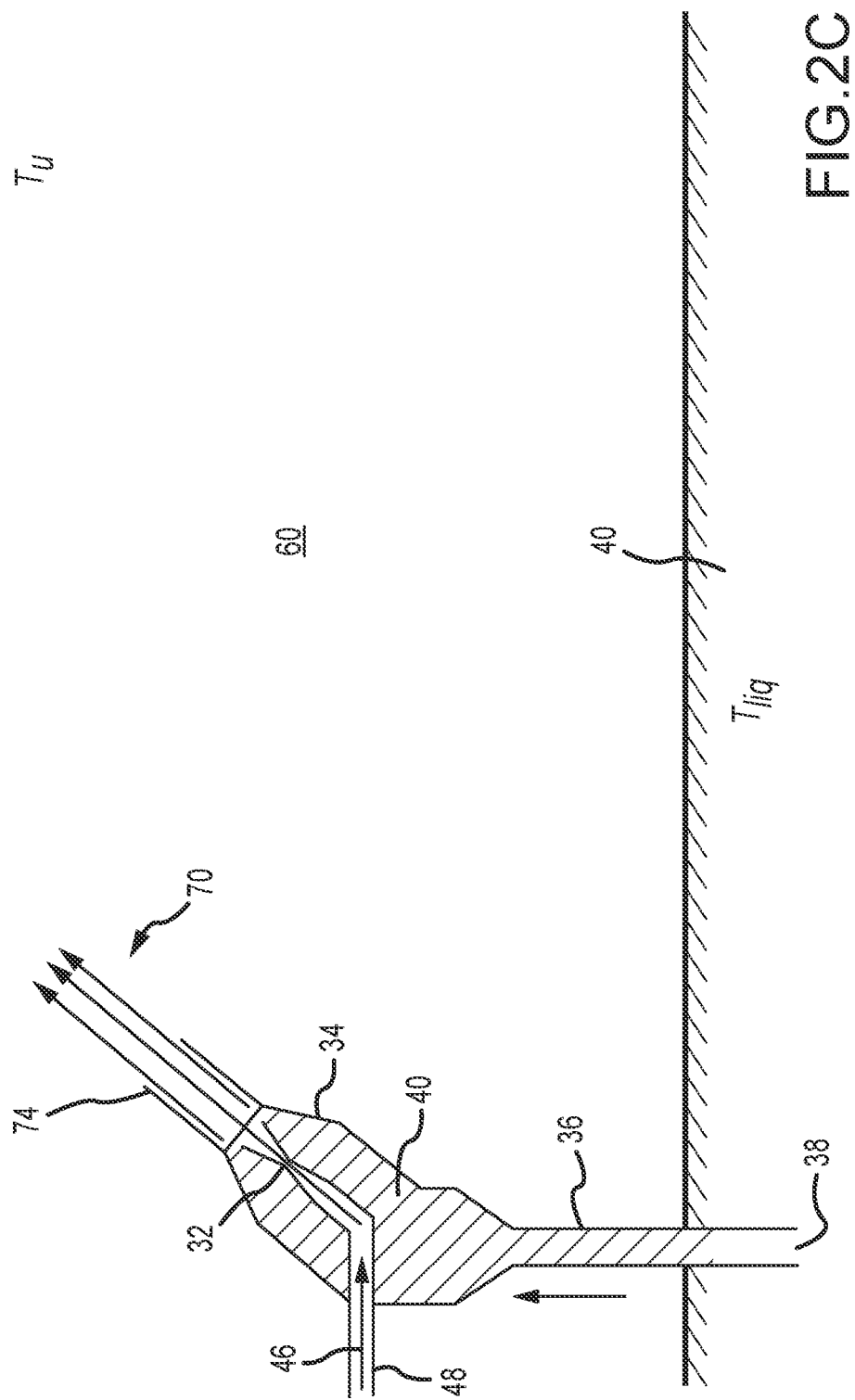

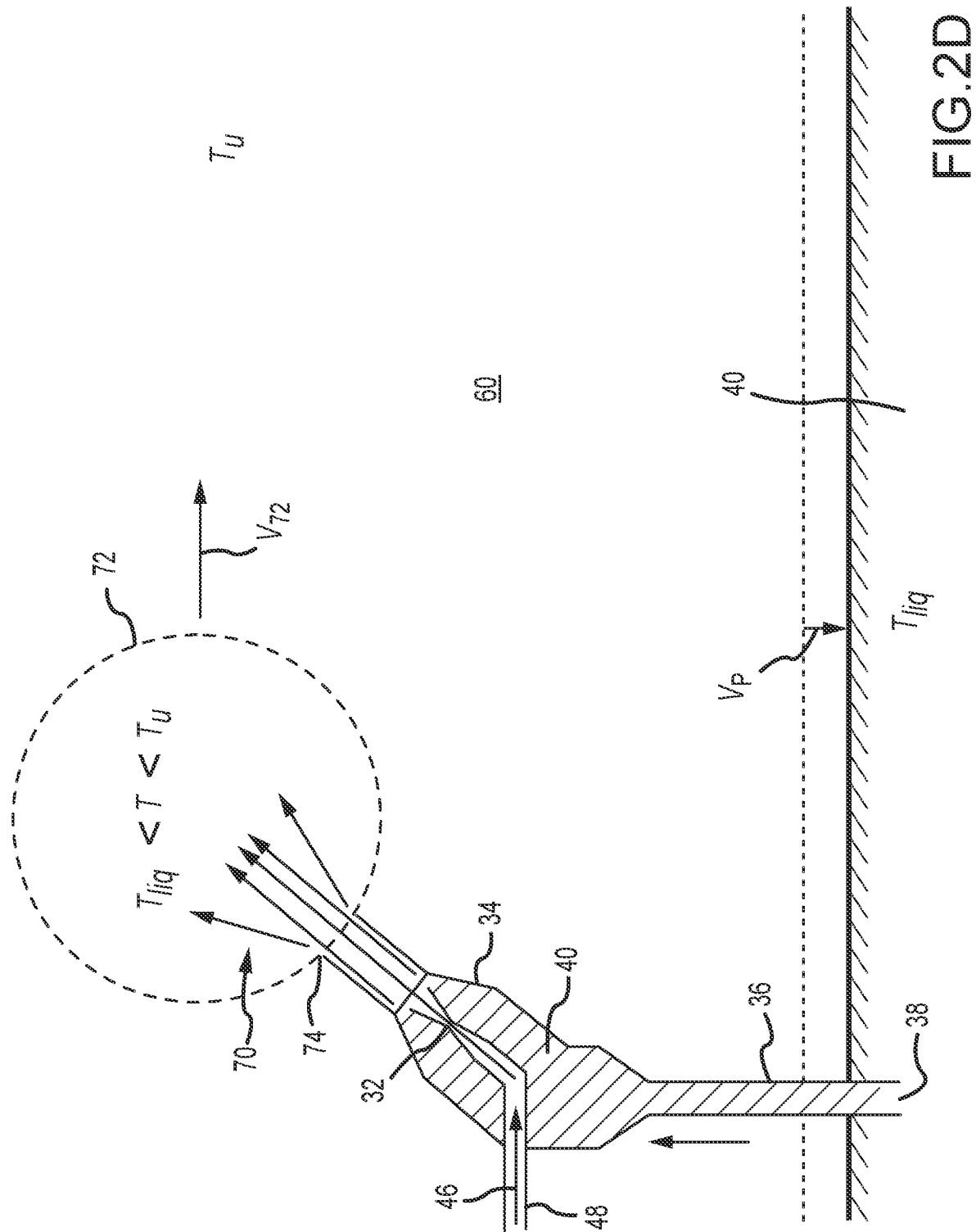

METHOD AND APPARATUS FOR CONTROLLING TEMPERATURE AND PRESSURE INSIDE A PROPELLANT TANK

CROSS-REFERENCE TO RELATED APPLICATIONS

This application claims the benefit of priority from U.S. Provisional Patent Application No. 63/147,092 filed Feb. 8, 2021 entitled "Ullage Conditioning System Without Pressurization," and U.S. Provisional Patent Application No. 63/147,097 filed Feb. 8, 2021 entitled "Ullage Conditioning System With Pressurization," the entire disclosures of which are hereby expressly incorporated by reference in their entireties.

FIELD OF THE INVENTION

The present disclosure relates to the field of aerospace and, more particularly, to methods and apparatus for conditioning ullage in a propellant tank in order to address a variety of issues. Such issues include but are not limited to adding propellant to a propellant tank in a microgravity environment without venting the tank and reducing the risk of ullage pressure collapse associated with unsettled liquid and gaseous propellants.

BACKGROUND OF THE INVENTION

On earth, where there is a constant gravitational field, liquid propellant transfer during a tank fill is straight forward since the liquid loads from the bottom up and allows a vent valve at the top of the tank to vent the displaced gas volume, and the boiled off gases in the case of super cold propellants. Super cold propellants are those that change from a liquid phase to a gas phase at temperatures below zero degrees Centigrade or 32 degrees Fahrenheit. Cryogens are an example of a super cold propellant. In most rocket stage tanks, whether in a microgravity environment such as on-orbit, in space, or on the earth's surface generally, propellant in a tank could be in two phases, namely, a liquid phase and a gaseous phase. For the purposes of this invention, the solid phase is not considered. A super cold liquid propellant transferred into the tank will flash boil as the liquid enters the warmer tank and will result in increased tank pressure that must be controlled. Moreover, in a microgravity environment, the liquid portion of the propellant could be anywhere within the tank which means that venting to control the pressure would likely vent valuable quantities of the precious liquid propellant rather than venting the boil off gas or gaseous phase propellant making the transfer process in space very inefficient. Aspects of the present disclosure provide a system and method of controlling the ullage temperature and pressure during microgravity propellant transfer allowing for propellant fill without venting of the tank.

A different issue associated with the use of super cold propellants in space travel is ullage pressure collapse (UPC). In one example, UPC can occur in a microgravity environment when the super cold liquid propellant unsettles and moves about the propellant tank. This phenomenon may occur, for example, when an upper stage is separated from a booster followed by an upper stage or second stage engine start where the upper or second stage accelerates. Conversely, UPC could also be caused by a deceleration. Unsettled super cold liquid propellant may crest and rain through or mix with the ullage causing the ullage to cool significantly. In turn, pressure within the propellant tank drops significantly and, in some cases, uncontrollably. The result can lead to a structural failure of the propellant tank and intermediate bulkhead, or engine malfunction. Higher ullage volumes could exacerbate the issue. Aspects of the present disclosure provide a system and method of controlling the ullage temperature and pressure to eliminate UPC.

These same systems and methods may also be used on the launch pad, on earth, during tank fill operations to condition ullage and prevent catastrophic over pressurization events.

A microgravity environment is a spatial environment in which acceleration is minimal or nearly zero. Such environments are imposed on objects while within earth's gravitational influence when the object is in free fall, or outside of earth's gravitational influence when the object has little to no acceleration.

SUMMARY OF THE INVENTION

Aspects of the present disclosure provide the ability to refuel cryogenic propulsion stages on-orbit which, in turn facilitates space transportation beyond low earth orbit. The ability to efficiently transfer cryogens between earth-to-orbit tanker vehicles, orbiting propellant depots, and space transportation vehicles is an alternate for earth departure missions rather than developing larger rockets.

Aspects of the present disclosure provide the ability to eliminate UPC by conditioning the temperature and pressure of the ullage and to extract thermal potential energy from the ullage and prevent ullage pressure collapse. The present invention can be utilized to condition the ullage gas on the ground and in flight.

In one embodiment, one or more aerodynamic pumps are associated with a propellant tank. In a preferred embodiment, the aerodynamic pump is a jet pump. A pressurized motive fluid source supplies a condensable motive fluid to an inlet of the aerodynamic pump. The pressure of the motive fluid source must be greater than the pressure in the propellant tank to allow flow. A larger pressure difference is preferred. Liquid propellant within the propellant tank is also in fluid communication with an inlet of the aerodynamic pump. In operation, the condensable motive fluid is accelerated through a nozzle to create a high velocity fluid stream or jet that reduces local static pressure and thereby creates a vacuum. The low static pressure syphons or suctions liquid cryogen out of the liquid space within the propellant tank. The syphoned liquid propellant is entrained or mixed into the flow of the high velocity motive fluid within a mixing tube or chamber. The two fluids mix to form a highly atomized spray of both the liquid cryogen propellant and the motive fluid through momentum transfer between the coflowing fluids. The mixed solution is then exhausted into the ullage space of the propellant tank where evaporation of the atomized spray lowers the ullage gas temperature. The condensable motive fluid is cooled by the mixing with the liquid cryogenic propellant. Because the resulting mixture has a lower temperature than the ullage, the temperature of a localized volume of the ullage is reduced and the total pressure of the ullage is reduced or at least not increased. Continued operation the aerodynamic pump expands the localized volume of reduced temperature ullage and continues to reduce the pressure within the propellant tank. The motive fluid can be pulsed repeatedly until the ullage gas is at the desired conditions or throttled proportionally until the desired operating conditions of the system are attained.

Thus, pressure within the propellant tank may be controlled without venting of the propellant tank and without loss of propellant.

According to aspects of this embodiment, the motive fluid may be the same as the propellant, for example liquid hydrogen or some other cryogenic propellant, or it may be some different fluid that does not adversely affect the tanked propellants, for example a fluid that may go into solution with the propellants. The motive fluid source may be external or internal to the propellant tank. The one or more aerodynamic pumps may be located at a perimeter of the propellant tank or at any other location within the propellant tank. The aerodynamic pump or, at a minimum, the mixing chamber of the aerodynamic pump, may be configured to move, oscillate or rotate relative to the interior of the propellant tank to eject the mixture of atomized motive fluid and liquid propellant over a larger localized volume.

The system of this embodiment is operated only by the introduction of the higher pressure motive fluid. No moving parts are required other than a valve to control the motive fluid supply. This system is ideally suited for use in the reduced or microgravity environment of space.

In another embodiment, an atomizer replaces the jet pump. Operation of the system remains similar. A pressurized primary fluid is accelerated, atomized, and ejected into the ullage of the propellant tank. Because the atomized spray has a temperature lower than the ullage, a localized volume of the ullage is cooled and pressure within the propellant tank is reduced. Continued operation the atomizer expands the localized volume of reduced temperature ullage and continues to reduce the pressure within the propellant tank. The fluid entering the atomizer can be pulsed repeatedly until the ullage gas is at the desired conditions or throttled proportionally until the desired operating conditions of the system are attained. Thus, pressure within the propellant tank may be controlled without venting of the propellant tank and without loss of propellant.

According to aspects of this embodiment, the atomized fluid may be the same as the propellant, for example liquid hydrogen or some other cryogenic propellant, or it may be some different fluid that does not adversely affect the tanked propellants, for example a fluid that may go into solution with the propellants. The fluid source may be external or internal to the propellant tank. One or more atomizers may be located at a perimeter of the propellant tank or at any other location within the propellant tank. The atomizer may be configured to move, oscillate or rotate relative to the interior of the propellant tank to spray the atomized fluid over a larger localized volume.

In another embodiment, a mechanical pump may be combined with an atomizer and the added condensable fluid may be unpressurized. One example of an acceptable mechanical pump is a centrifugal pump. Other types of mechanical pumps acceptable for this purpose include pumps of the positive displacement variety. Compared to an aerodynamic pump that has no moving parts, a mechanical pump includes moving parts which introduce possible points for failure not present with an aerodynamic pump. The mechanical pump would pressurize and drive the added primary fluid through an atomizer thereby atomizing the fluid. A localized volume or zone of ullage proximate the point of ejection from the atomizer will undergo a temperature decrease thereby reducing the pressure in the propellant tank. Continued operation the pump expands the localized volume or zone of reduced temperature ullage and continues to reduce the pressure within the propellant tank. The fluid can be pulsed repeatedly until the ullage gas is at the desired conditions or throttled proportionally until the desired operating conditions of the system are attained. Thus, pressure within the propellant tank may be controlled without venting of the propellant tank and without loss of propellant.

According to aspects of this embodiment, the primary fluid may be the same as the propellant, for example liquid hydrogen or some other cryogenic propellant, or it may be some different fluid that does not adversely affect the tanked propellants, for example a fluid that may go into solution with the propellants. The fluid source may be external or internal to the propellant tank. One or more mechanical pumps may be utilized. The pumps may be located external or internal to the propellant tank. The fluid may be introduced at a perimeter of the propellant tank or at any other location within the propellant tank. The pump or, at a minimum, the atomizer, may be configured to move, oscillate, or rotate relative to the interior of the propellant tank to eject the atomized fluid over a larger localized volume.

In a further embodiment, which is a variation of the first embodiment discussed above, an aerodynamic jet pump is combined with an unpressurized source of a condensable motive fluid and a mechanical pump pressurizes the motive fluid prior to the motive fluid entering the jet pump. This embodiment otherwise operates the same as the first embodiment.

In yet a further embodiment, an incondensable or non-condensable motive fluid is used to affect a different result. The pump may be an aerodynamic pump, for example, a jet pump. In the embodiments of FIGS. 1-4 and 7, the motive fluid is accelerated through a nozzle to create a high velocity fluid jet that reduces local static pressure and thereby creates a vacuum. The low static pressure suctions liquid cryogen propellant into a mixing tube where the cryogenic liquid propellant is entrained into the flow of the high velocity motive fluid to form a highly atomized spray of both the liquid cryogen and the motive fluid through momentum transfer between the coflowing fluids. The mixed solution is then exhausted into the ullage space of the propellant tank where evaporation of the atomized spray lowers the ullage gas temperature. Additionally, the non-condensable constituent increases the total pressure of the ullage. By reducing or minimizing the thermal potential energy, e.g., the difference in temperature between the ullage gas and the temperature of the liquid cryogenic propellant, the degree by which the ullage pressure can collapse is reduced and minimized, or perhaps eliminated.

Conditioning a propellant tank to avoid ullage collapse may be initiated while the tank is in a gravity environment, i.e., on earth. Conditioning may continue through launch and stage separation. Conditioning may also be initiated at or prior to other acceleration or deceleration events in a microgravity environment.

According to aspects of this embodiment, the incondensable motive fluid may not be the same as the propellant and should be some gaseous phase fluid that has a vaporization temperature below that of the propellant in which it is being mixed. For example, in a liquid hydrogen propellant tank, gaseous helium may be used. The incondensable motive fluid source may be external or internal to the propellant tank. The one or more pumps may be located external or internal to the propellant tank. The mixture of incondensable motive fluid and liquid propellant may be introduced at a perimeter of the propellant tank or at any other location within the propellant tank. The pump or, at a minimum, the mixing chamber of the pump, may be configured to move, oscillate or rotate relative to the interior of the propellant tank to eject the mixture of atomized motive fluid and liquid propellant over a larger localized volume.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about".

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. Section 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description, the drawing figures, and the exemplary claims set forth herein, taken in conjunction with this Summary of the Invention, define the invention.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

FIG. 1 is a schematic diagram of one embodiment of an upper or second stage of a launch vehicle including a system for controlling ullage temperature and pressure.

FIG. 2A is a cross-sectional view of one embodiment of a non-operating jet pump assembly inside a propellant tank.

FIG. 2B is a cross-sectional view of the embodiment of FIG. 2A, with the jet pump assembly operating and showing propellant entering a syphon.

FIG. 2C is a cross-sectional view of the embodiment of FIG. 2A, with the jet pump assembly operating and showing motive fluid and propellant mixing in a mixing tube and exiting the mixing tube into a propellant tank.

FIG. 2D is a cross-sectional view of the embodiment of FIG. 2A, with the jet pump assembly operating and showing a volume of ullage at a temperature lower than the temperature of the ullage generally.

FIG. 2E is a cross-sectional view of the embodiment of FIG. 2A showing the effect of continuing operation of the jet pump assembly.

FIG. 3 is a schematic diagram of a propellant tank containing an alternative embodiment of a jet pump assembly.

FIG. 4 is a schematic diagram of a propellant tank containing multiple jet pump assemblies.

FIG. 5 is a schematic diagram of an alternative embodiment of an upper or second stage of a launch vehicle including a system for controlling ullage temperature and pressure.

FIG. 6 is a schematic diagram of a further alternative embodiment of an upper or second stage of a launch vehicle including a system for controlling ullage temperature and pressure.

FIG. 7 is a schematic diagram of another alternative embodiment of an upper or second stage of a launch vehicle including a system for controlling ullage temperature and pressure.

The accompanying drawings, which are incorporated in and constitute a part of the specification, illustrate embodiments of the invention and, together with the general description of the invention given above and the detailed description of the drawings given below, serve to explain the principles of the invention.

The drawings are not necessarily to scale and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

FIG. 1 illustrates a first embodiment of a propellant system for a launch vehicle 10. Two propellant tanks 12 and 14 are shown in coaxial alignment. Each tank contains a liquid cryogenic propellant, for example, oxygen 40 in tank 12 or hydrogen 42 in tank 14. A propellant supply line 16 connects the upper tank 12 to the engine 18. A second propellant supply line 20 connects the lower tank 14 to the engine 18. The two propellants are mixed and combusted by the engine 18. A valve 22 may be provided in association with the upper tank 12 to supply propellant to or vent propellant from the upper tank 12. Similarly, a second valve 24 may be provided in association with the lower thank 14 to supply propellant from the tank 14.

Using the upper tank 12 for discussion purposes, FIG. 1 shows an aerodynamic jet pump assembly 30 comprising a motive nozzle 32 disposed in the proximal end of a mixing tube 34, a syphon 36 in fluid communication with the mixing tube 34 and having a distal end 38 disposed in liquid cryogenic propellant 40. A source 44 of pressurized motive fluid 46 is in fluid communication with the motive nozzle 32 by a supply line 48. A valve 50 controls the supply of motive fluid 46 to the motive nozzle 32. The motive fluid 46 is maintained under pressure within the source 44. When the valve 50 is opened, motive fluid 46 will flow to the motive nozzle 32 and when the valve 50 is closed, no motive fluid will be supplied to the motive nozzle 32. The motive fluid 46 may be the same as the propellant, for example, liquid oxygen in the case of tank 12 or some other cryogenic propellant. Alternatively, the motive fluid may be different from the propellant, for example, helium or some other element or composition that would not adversely affect the propellant.

Tank 14 uses a second jet pump assembly 30' that is the same as jet pump assembly 30 associated with tank 12. The same reference numerals, further including a prime (') symbol, are used to designate duplicate components associated with tank 40. Thus, the jet pump assembly includes a motive nozzle 32', a mixing tube 34', and a syphon 36' with a distal end 38'. Here, because propellant tank 14 contains liquid hydrogen, the source 44' associated with tank 14 may contain liquid hydrogen as the motive fluid 46'. A valve 50' controls the flow of pressurized motive fluid 46' in supply line 48' to the tank 14.

Figure 2E:
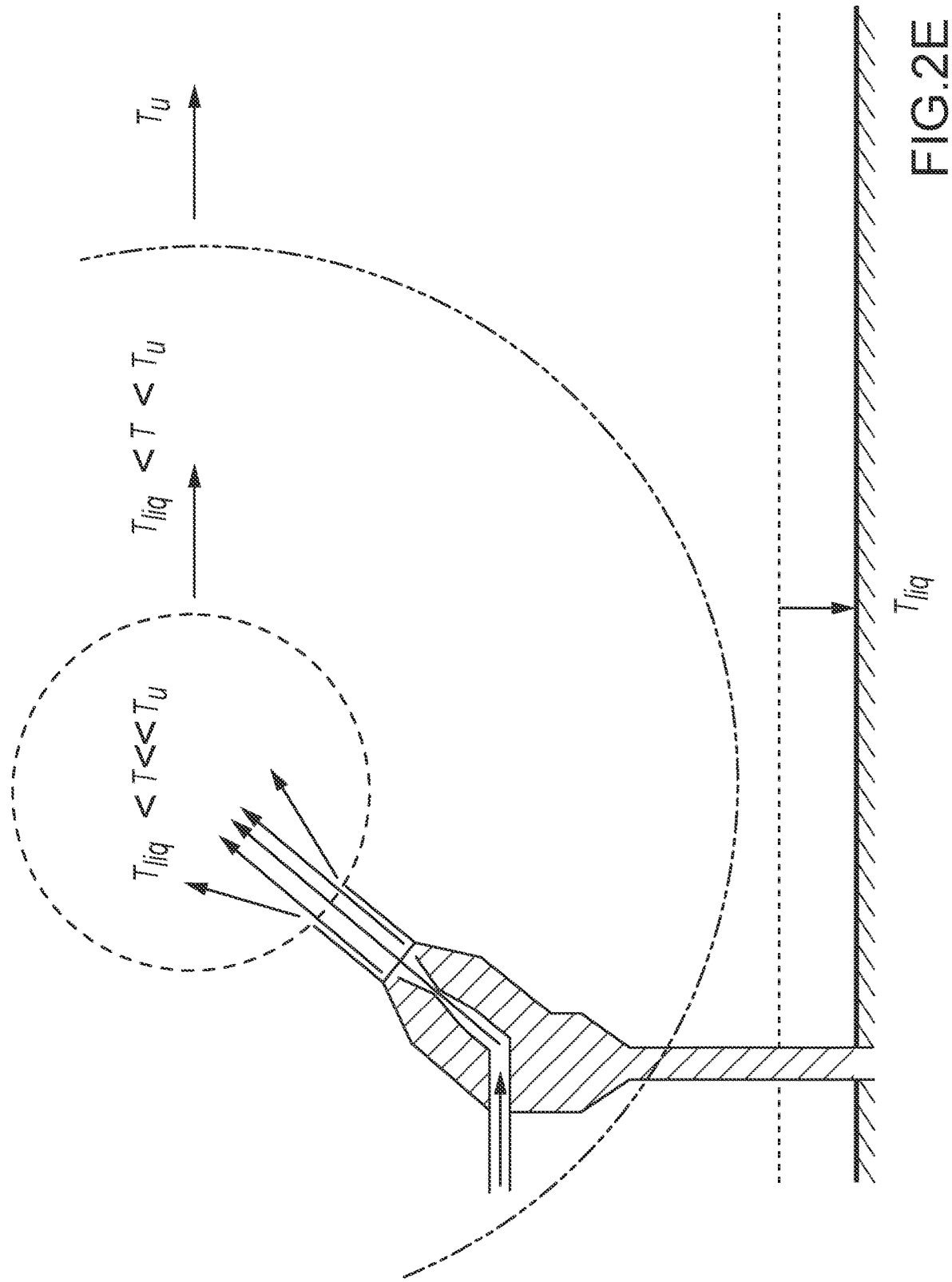

Turning to FIGS. 2A-2E, operation of the jet pump assembly 30 will be described. Jet pump 30' operates in the same way. FIG. 2A illustrates the jet pump assembly 30 in a static or non-operating state. As seen, the distal end of the syphon 38 is positioned within the liquid propellant 40. The motive nozzle 32 and mixing tube 34 are not positioned in the liquid propellant but are positioned in ullage or gaseous propellant 60. It will be appreciated by those of skill in the art that a propellant tank will rarely, if ever, be filled completely with liquid cryogenic propellant. Rather, some portion of the propellant in the tank will be in a gaseous state—also known as ullage. Also, the position of the interface between the liquid and gaseous propellant will change over time and will not always be demarcated by a planer surface as illustrated in the drawings of this disclosure which are provided for illustrative purposes and not intended to depict every possible scenario of liquid and gaseous propellant cohabitating in a single propellant tank. The label $T_{liq}$ represents the temperature of the liquid cryogenic propellant 40. The label $T_U$ represents the temperature of the ullage 60. The temperature of the liquid cryogenic liquid propellant will always be less than that of the ullage 60 ($T_{liq} < T_U$).

In FIG. 2B, valve 50 is open and pressurized motive fluid 46 is flowing from the source 44 to the motive nozzle 32. The condensable motive fluid 46 is accelerated through the nozzle 32 to create a high velocity fluid stream or jet that reduces local static pressure and thereby creates a vacuum. The nozzle 32 may be configured as a subsonic, sonic or supersonic nozzle. Consistent with Bernoulli's principle, an area or zone of low static pressure 64 is created proximate the exit 66 of the motive nozzle 32. An effect of the low-pressure area 64 is that the liquid propellant 40 is drawn through the syphon 36 to the mixing tube 34.

FIG. 2C illustrates mixing of the liquid propellant 40 with the motive fluid 46. More particularly, as motive fluid 46 continues to be supplied to the motive nozzle 32, the propellant 40 will be fully drawn into the mixing tube 34 where it will mix with or be entrained into the high velocity motive fluid 46 exiting the motive nozzle 32. The two fluids mix to form a highly atomized spray or mixture 70 of both the liquid cryogen propellant 40 and the motive fluid 46 through momentum transfer between the coflowing fluids.

FIG. 2D illustrates the creation of an area 72 of reduced temperature within the ullage 60 proximate the exit 74 of the mixing tube. More particularly, the condensable motive fluid 46 is cooled by the mixing with the liquid cryogenic propellant 40. As a result, the temperature T of the area 72 is less than the temperature $T_U$ of the ullage 60 and greater that the temperature $T_{liq}$ of the propellant 40 ($T_{liq} < T <= T_U$). Because evaporation is occurring, if the process continues the temperature of the area 72 and the temperature of the ullage ($T_U$) could reach an equilibrium and approach or reach the temperature of the liquid propellant ($T_U$). Evaporation of the liquid droplets in the mixture efficiently cools the ullage. Because the resulting mixture of the motive fluid 46 and the liquid propellant 40 has a lower temperature than the ullage 60, the temperature of a localized volume 72 of the ullage is reduced and the total pressure of the ullage 60 is reduced or at least not increased. The arrow VP illustrates that the volume of the liquid propellant 40 diminishes as the result of syphoning liquid propellant 40 to mix with the motive fluid 32. The arrow $V_{72}$ illustrates that the volume of the localized area 72 increases based upon the duration of the operation of the jet pump assembly 30. Indeed, as the jet pump assembly continues to operate, the volume of area 72 will increase as generally illustrated in FIG. 2E expanding the volume $V_{72}$ of reduced temperature ullage and further reducing the pressure within the propellant tank.

The present invention is superior to a detachable ground-only conditioning system for several reasons, including: 1) it has the unique capability to condition the ullage in flight to reduce the effects of aero heating and ambient helium pressurization, 2) it is more cost effective, 3) it is less complicated, 4) there are no additional moving parts, and 5) the ambient helium and the ullage gas are cooled.

Figure 3:
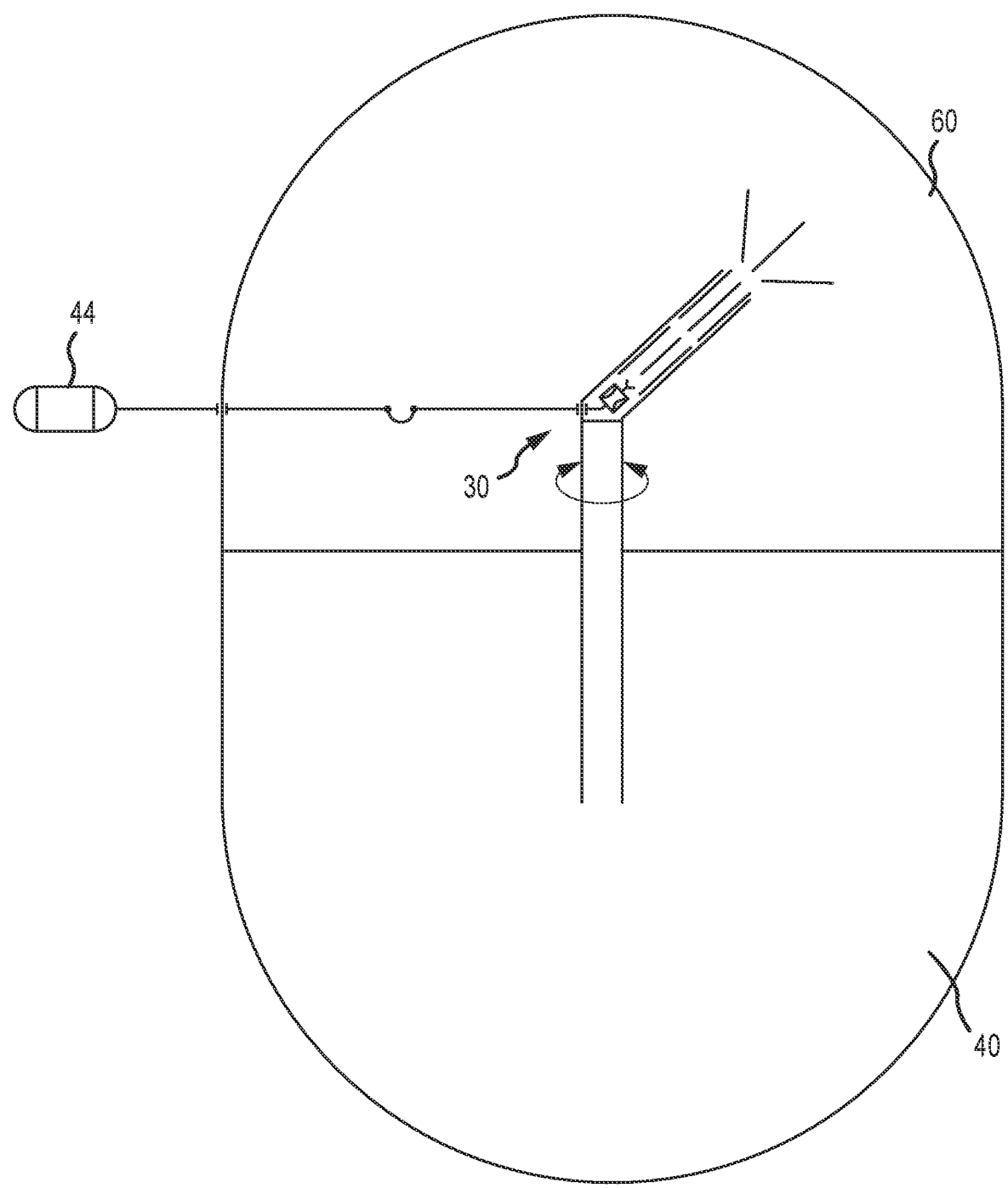
Figure 4:
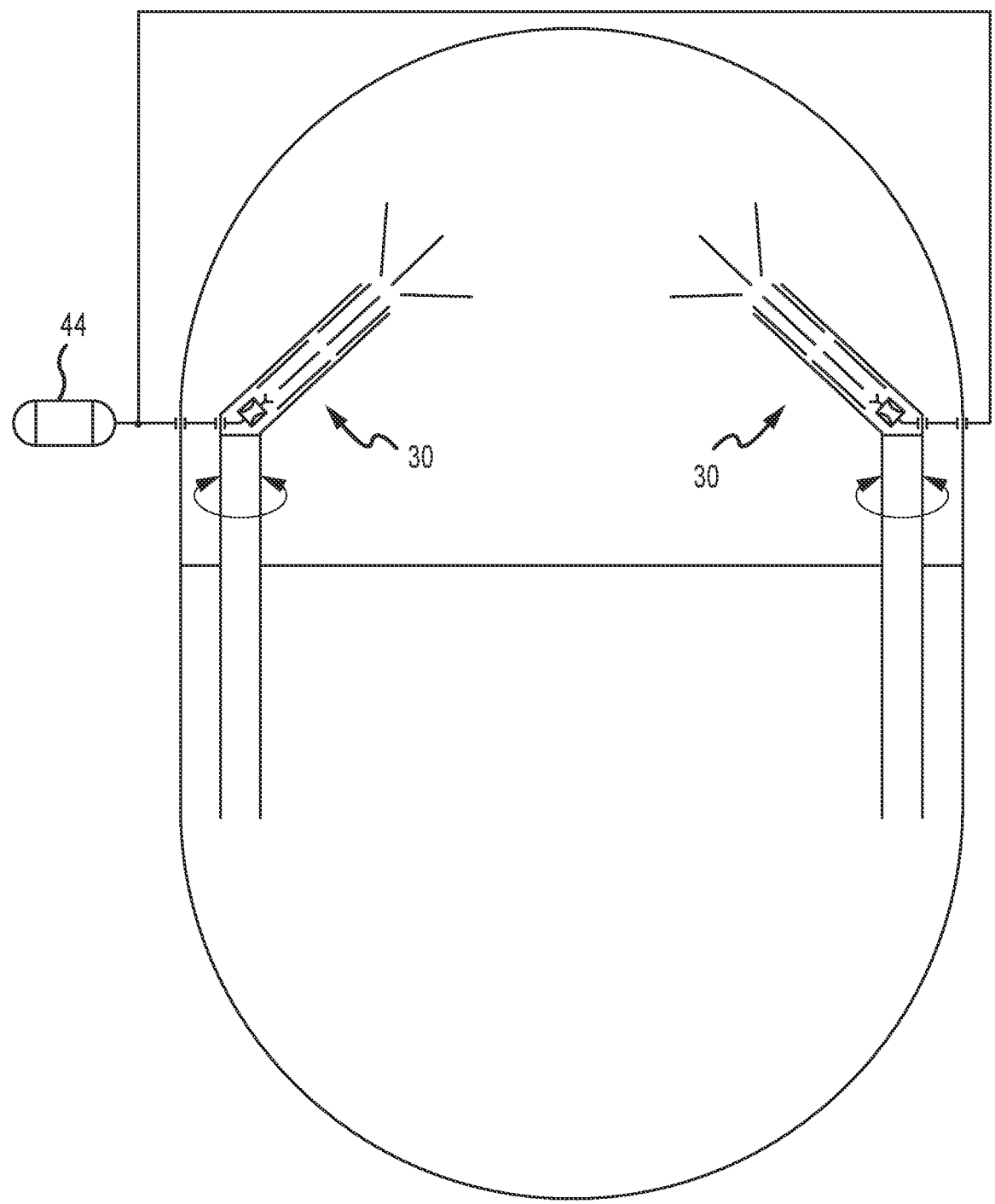

By using forced convective vaporization as explained above, a propellant tank may be filled with cryogenic liquid propellant without a need to vent the tank during the fill operation. The operation introduces a motive fluid in the form of a condensable, pressurized and atomized cryogenic liquid propellant into the tank ullage to decrease the ullage gas temperature in a controlled manner. In the specific example of FIG. 1, the vehicle 10 includes two propellant tanks 12 and 14, each with a different cryogenic propellant. Cryogenic liquid oxygen may be in one tank and cryogenic liquid hydrogen in the other. In this context, where the motive fluid is condensable, cryogenic liquid oxygen may be the motive fluid for the oxygen tank 12 and cryogenic liquid hydrogen may be the motive fluid for the hydrogen tank. In this scenario, cryogenic liquid oxygen should not be added to the tank containing cryogenic liquid hydrogen. In other scenarios, it may be acceptable to utilize a single common condensable motive fluid for each propellant tank 12 and 14. Examples of other acceptable condensable fluids include helium and nitrogen. The motive fluid need not be continuously supplied to the motive nozzle but may be pulsed repeatedly, intermittently stopped and started or the nozzle 50 and 50' may be throttled proportionally to regulate the cooling in the tank and control pressure. In FIGS. 1 and 2A-2E, the jet pump assembly 30 is shown at a position adjacent a perimeter wall of the tank. As illustrated in FIGS. 3 and 4, the jet pump assembly 30 may be positioned in the center of the tank or at another location based upon other factors. The assembly may also be configured to rotate or oscillate to disperse the atomized mixture over a larger volume. In alternative embodiments, multiple jet pump assemblies may be included in a single tank. In addition, the source 44 of the motive fluid 46 is show outside of the tank 12. In a non-limiting alternative embodiment, the source 30 may be positioned inside the tank 12. Further still, FIG. 1 shows a separate source 44 and 44' for each tank 12 and 14, respectively. A single source tank may supply motive fluid to both tanks 12 and 14 in appropriate circumstances and under appropriate conditions as would be understood by those of skill in the art upon review of the present disclosure.

Figure 5:
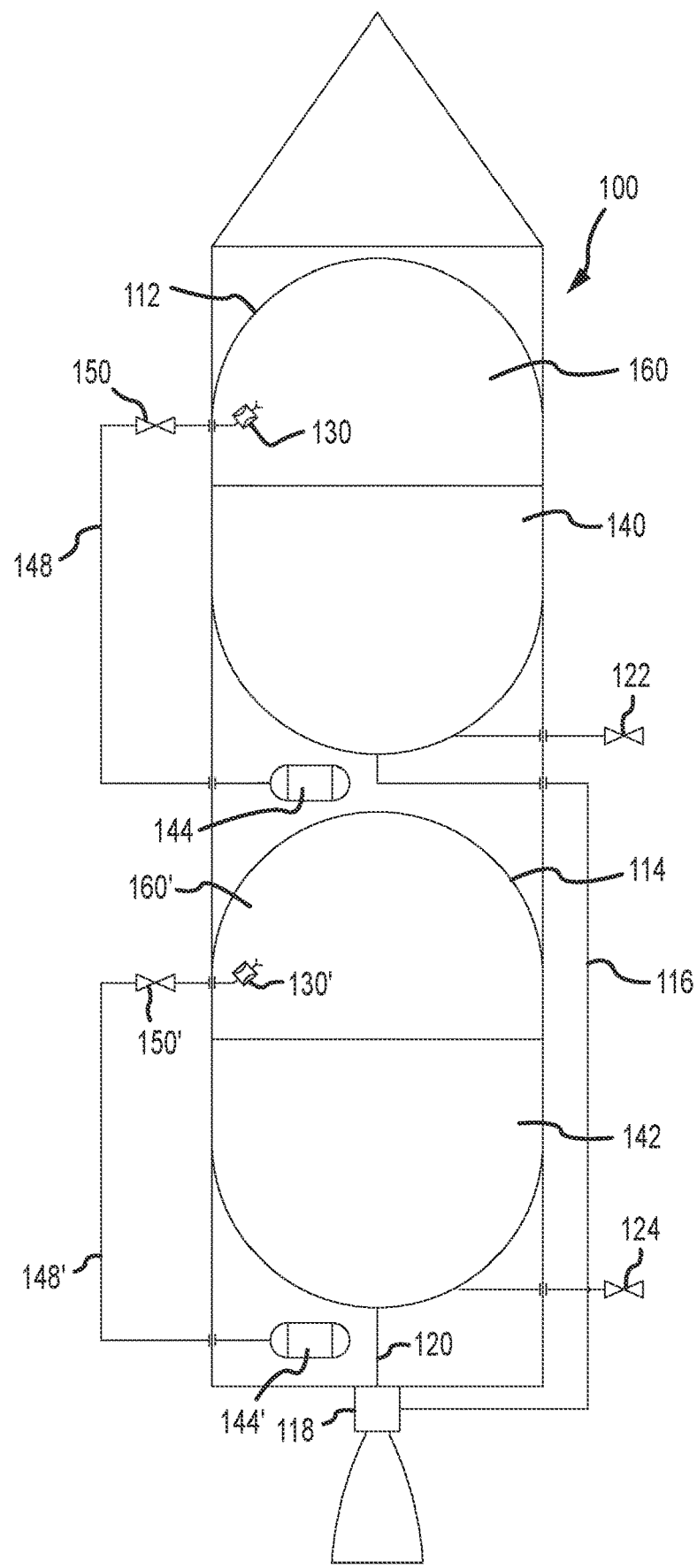

FIG. 5 illustrates another embodiment of a system for controlling propellant tank temperature and pressure for use in filling propellant tanks with cryogenic liquid propellant without the need to vent the tank. An upper or second stage 100 of a launch vehicle is shown. The vehicle contains a first propellant tank 112 for holding a first cryogenic liquid propellant 140 and a second propellant tank 114 for holding a second cryogenic liquid propellant 142. A propellant supply line 116 connects the upper tank 112 to the engine 118. A second propellant supply line 120 connects the lower tank 114 to the engine 118. The two propellants are mixed and combusted by the engine 118. A valve 122 may be provided in association with the upper tank 112 to supply propellant to or vent propellant from the upper tank 112. Similarly, a second valve 124 may be provided in association with the lower thank 14 to supply propellant or vent propellant from the tank 114.

The upper tank 112 further includes an atomizer 130 connected to a source 144 of a pressurized, motive fluid 146 that is supplied to the atomizer 130 by a supply line 148. A valve 150 controls the flow of motive fluid 146 to the atomizer 130. The lower or second tank 114 includes the same components. An atomizer 130' is connected to a source 144' of a pressurized, motive fluid 146' that is supplied to the atomizer 130' by a supply line 148'. Nozzle 150' controls the flow of the motive fluid 146' to the atomizer 130'.

Figure 6:
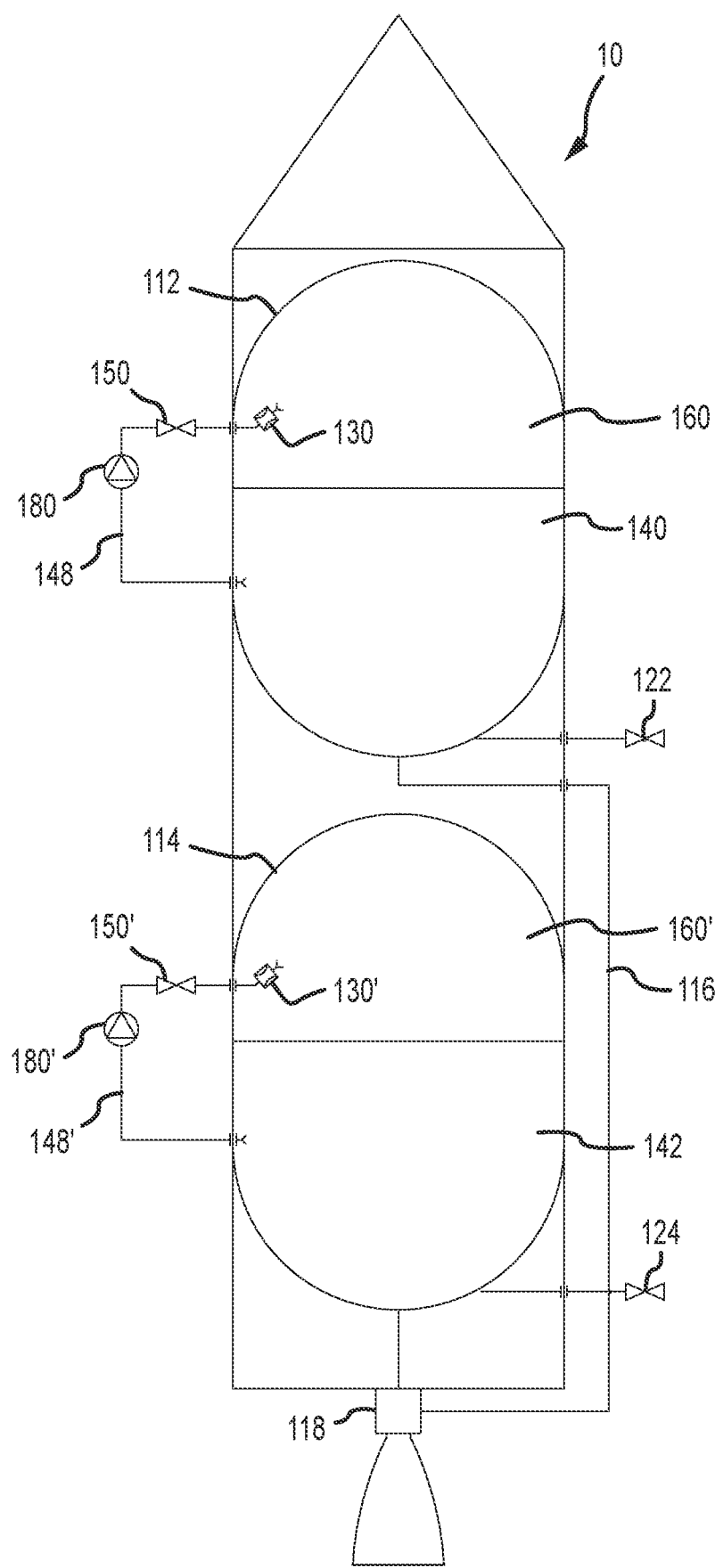

The embodiment of FIG. 6 illustrates a further alternative. Here, the motive fluid is the cryogenic liquid propellant in each of the tanks 112 and 114. A pump 180 is provided in association with the first tank 112 and a pump 180' is provided in association with the second tank 114 to withdraw the propellant from the tank and forward it to the atomizers 130 and 130'. In one non-limiting example, the pumps 180 and 180' are centrifugal pumps. Alternative pumps could be of the positive displacement variety.

The embodiments illustrated in FIGS. 5 and 6 may also be used to control ullage temperature and pressure within a propellant tank containing cryogenic liquid propellant. In operation, a condensable motive fluid under pressure is supplied to the atomizer 130 and 130' which atomizes the motive fluid and disperses it into the ullage of a propellant tank containing a liquid cryogenic propellant. Similar to the embodiments that utilize a jet pump assembly, the atomized spray has a temperature less than that of the ullage. In one non-limiting example regarding the embodiment of FIG. 5, the motive fluid 146 and 146' is the same liquid propellant as contained in the propellant tank. In other non-limiting examples involving the embodiment of FIG. 5, the motive fluid may be cryogenic liquid helium or nitrogen. The atomized spray creates a volume or localized area having a temperature less than that of the ullage generally, which reduces pressure within the tank. Continuing to supply the motive fluid to the atomizer further reduces the temperature of the ullage and further controls pressure within the tank.

In the embodiments of FIGS. 5 and 6, the motive fluid 146 and 146' need not be continuously supplied to the atomizer 130 and 130' but may be pulsed repeatedly, intermittently stopped and started or the nozzle 150 and 150' may be throttled proportionally to regulate the cooling in the tank and control pressure. In FIGS. 5 and 6, the atomizers 130 and 130' are shown at a position adjacent a perimeter wall of the tank. Similar to the jet pump assembly embodiments illustrated in FIGS. 4 and 5, the atomizers 130 and 130' may be positioned in the center of the tank or at another location based upon relevant factors. The atomizer may also be configured to rotate or oscillate to disperse the atomized mixture over a larger volume. In alternative embodiments, multiple atomizers may be included in a single tank. In addition, the source 144 and 144' of the motive fluid 146 and 146' are shown outside of the tank 12. In a non-limiting alternative embodiment, the source 144 and 144' may be positioned inside the tank 112 and 114. Further still, FIG. 5 shows a separate source 144 and 144' for each tank 112 and 114, respectively. A single source tank may supply motive fluid to both tanks 112 and 114 under appropriate circumstances and under appropriate conditions as would be understood by those of skill in the art upon review of the present disclosure.

Figure 7:
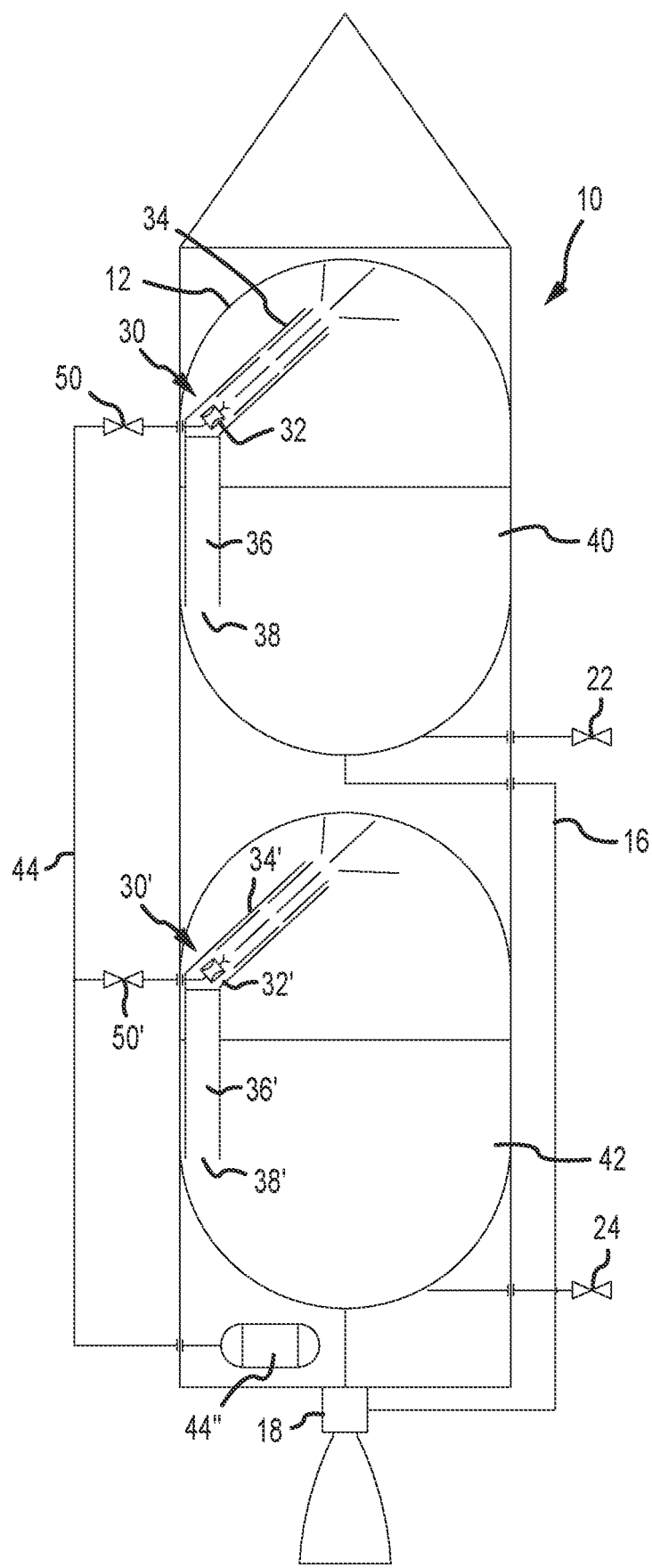

The embodiment illustrated in FIG. 7 is an alternative to the embodiments of FIGS. 1 and 3-5. Here, a single motive fluid source 44" provides pressurized, incondensable motive fluid to the jet pump assemblies 30 and 30'. Because there are two different cryogenic propellants involved, the motive fluid should not be one of the propellants but rather a fluid that is incondensable in both propellants like helium. As with all of the embodiments disclosed herein, the propellant tanks may be conditioned separately or simultaneously.

At least some of the embodiments illustrated and discussed herein may be used for purposes other than filling a propellant tank with a liquid cryogenic propellant without needing to vent the tank. In particular, embodiments illustrated and described may be used to reduce or eliminate the occurrence of ullage collapse. In the embodiments illustrated in FIGS. 1-4 and 7, an incondensable or non-condensable fluid may be used in place of the condensable motive fluid. The incondensable motive fluid is accelerated through a nozzle to create a high velocity fluid jet that reduces local static pressure and thereby creates a vacuum. The low static pressure suctions liquid cryogen out of the liquid space within the propellant tank where it is entrained into the flow of the high velocity motive fluid, preferably within a mixing chamber or tube, to form a highly atomized spray of both the liquid cryogen and the motive fluid through momentum transfer between the coflowing fluids. The mixed solution is then exhausted into the ullage space of the propellant tank where evaporation of the atomized spray lowers the ullage gas temperature. In the embodiment of FIG. 6, the motive fluid is accelerated through an atomizer creating a highly atomized spray that has a temperature lower than that of the ullage generally. Because a non-condensable motive fluid is used, total pressure of the ullage is increased. By reducing or minimizing the thermal potential energy, e.g., the difference in temperature between the ullage gas and the temperature of the liquid cryogenic propellant, the degree by which the ullage pressure can collapse is reduced and the risk or ullage collapse is also reduced or perhaps eliminated.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. It is to be understood that the phraseology and terminology used herein is for the purpose of description and should not be regarded as limiting.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

The features of the various embodiments described herein are not intended to be mutually exclusive when the nature of those features does not require mutual exclusivity. Instead, features and aspects of one embodiment may be combined with features or aspects of another embodiment. Additionally, the description of a particular element with respect to one embodiment may apply to the use of that particular element in another embodiment, regardless of whether the description is repeated in connection with the use of the particular element in the other embodiment.

Examples provided herein are intended to be illustrative and non-limiting. Thus, any example or set of examples provided to illustrate one or more aspects of the present disclosure should not be considered to comprise the entire set of possible embodiments of the aspect in question. Examples may be identified by use of the terms or phrases "for example," "such as," "by way of example," "e.g.," and other language commonly understood to indicate that what follows is an example.

What is claimed is:

1. A method for controlling the temperature and pressure in a propellant tank in a microgravity environment, comprising:

a. providing a tank containing a first fluid, the first fluid having a liquid portion and a gaseous portion;
b. introducing a second fluid into the tank;
c. accelerating the second fluid to create a first zone of reduced static pressure proximate the accelerated second fluid;
d. using the first zone of reduced static pressure to draw a first portion of the liquid portion of the first fluid into contact with the second fluid;
e. mixing the first portion of the liquid portion of the first fluid with the second fluid to create a mixture;
f. introducing the mixture into the gaseous portion of the first fluid;
g. inducing cooling of a portion of the gaseous portion of the first fluid by heat transfer with the introduced mixture to reduce the pressure and temperature of the portion of the gaseous portion of the first fluid within a second zone within the tank; and
h. adding first fluid into the tank wherein the added first fluid is in a liquid phase.

2. The method of claim 1, wherein the new first fluid is introduced to the tank without venting any of the first fluid from the tank.

3. The method of claim 1, further comprising continuing steps (b) to (g) to expand the volume of the second zone.

4. The method of claim 1, further comprising atomizing at least a portion of the first portion of the liquid portion of the first fluid prior to exhausting the mixture into the gaseous portion of the first fluid.

5. The method of claim 1, further comprising atomizing at least a portion of the second fluid prior to introducing the mixture into the gaseous portion of the first fluid.

6. The method of claim 1, wherein step (g) and step (h) overlap for at least a portion of time.

7. The method of claim 1, wherein the second fluid is condensable.

8. The method of claim 1, wherein at least the second fluid is non-condensable.

9. The method of claim 1, wherein the induced cooling of at least a portion of the gaseous portion of the first liquid comprises at least one of evaporative cooling and sensible heat transfer.

10. The method of claim 1, wherein accelerating the second fluid comprises moving the second fluid through a nozzle.

11. The method of claim 10, wherein the nozzle comprises a jet pump.

12. The method of claim 10, wherein the nozzle comprises an atomizer.

13. The method of claim 1, wherein the mixture is introduced into the gaseous portion of the first fluid at a high velocity.

14. A method for controlling the temperature and pressure in a propellant tank, comprising:

a. providing a tank containing a first fluid, the first fluid having a liquid portion and a gaseous portion and wherein at least a portion of the liquid portion is at least partially dispersed in the gaseous portion;
b. introducing a non-condensable second fluid into the tank;
c. accelerating the second fluid to create a first zone of reduced static pressure proximate the accelerating second fluid;
d. using the first zone of reduced static pressure to draw a first portion of the liquid portion of the first fluid into contact with the second fluid;
e. mixing the first portion of the liquid portion of the first fluid with the second fluid to create a mixture;

f. introducing the mixture into the gaseous portion of the first fluid; and g. inducing cooling of a portion of the gaseous portion of the first fluid by heat transfer with the introduced mixture to reduce the pressure and temperature of the portion of the gaseous portion of the first fluid within a second zone within the tank.

15. The method of claim 14, wherein the second fluid has a boiling point below zero degrees Fahrenheit.

16. The method of claim 14, wherein the second fluid is at least one of a non-condensable fluid in the liquid temperature range of the first fluid and has a boiling point below that of the first fluid.

17. The method of claim 14, further comprising continuing steps (b) to (g) to expand the volume of the second zone.

18. The method of claim 14, wherein accelerating the second fluid comprises moving the second fluid through a nozzle.

19. The method of claim 18, wherein the nozzle comprises a jet pump.

20. The method of claim 18, wherein the nozzle comprises an atomizer.

\* \* \* \* \*